Patented Nov. 15, 1949

2,488,299

UNITED STATES PATENT OFFICE 2,488,299

METHOD OF PRODUCING HEXAFLUOROPHOSPHORIC ACID

Willy Lange, Cincinnati, Ohio, and Ralph Livingston, Oak Ridge, Tenn., assignors to Ozark-Mahoning Company, Tulsa, Okla., a corporation of Delaware No Drawing. Application December 4, 1947, Serial No. 789,758. In Canada July 17, 1947

4 Claims. (Cl. 23—139)

1

This invention relates to the production of hexafluorophosphoric acid, $HPF_6$, hereinafter for brevity termed "hexa" acid in accordance with the method originally disclosed in our copending application Serial No. 696,620, filed September 12, 1946, entitled Method of producing and purifying hexafluorophosphoric acid of which this is a division.

In the said application we have described our method of making hexa acid by reaction between hydrogen fluoride and certain compounds of pentavalent phosphorus and have claimed the said method as it may be practised by use of oxygen containing compounds of pentavalent phosphorus which on reaction with hydrogen fluoride under the conditions specified in the said application yield oxygen to combine with the hydrogen of the hydrogen fluoride and produce water serving as an ionization medium for the hexa acid which cannot exist in anhydrous state.

Also disclosed in said application is our method of producing hexa acid from a compound of pentavalent phosphorus devoid of oxygen, for example $PF_5$, which is incapable of producing in anhydrous reaction with HF the water needed as an ionization medium for hexa acid, and this divisional application is directed specifically to this aspect of our invention which is appropriately claimed herein.

It is thus an object of the present invention to provide pursuant to the principles set forth in said prior copending application a method for producing hexa acid from a compound of pentavalent phosphorus devoid of oxygen, specifically $PF_5$.

Other objects, purposes and advantages will appear as the following description proceeds, it being understood the disclosure in said prior copending application of certain broad general principles relating to the behavior of phosphorus compounds in the presence of HF may be considered as incorporated herein by reference.

As more fully explained therein, hexa acid is incapable of independent existence in the anhydrous state, but may be produced in a hydrous system in which it may exist in equilibrium such that when the solution is heated under conditions preventing the loss of volatile and/or gaseous constituents and then cooled to the original temperature or below no quantitative loss of hexa acid occurs. At constant temperature in equilibrium solution the hexa acid when present in fairly high concentration does not hydrolyze; as dilution is increased by addition of water hydrolysis takes place at a decreasing rate until at a concentration of a few per cent $HPF_6$ it becomes imperceptible and a false appearance of stability is reached. If, however, the dilute solution is heated in a closed system the $HPF_6$ decomposes and is not reconstituted on subsequent cooling, showing it actually is not stable.

To produce $HPF_6$ in equilibrium therefore it is necessary that certain ratios of the quantities of the materials supplied be adhered to and that conditions be maintained during the reaction suitable for insuring the retention of gaseous and volatile constituents; when $PF_5$ is used as a starting material, being itself a gas at ordinary temperatures, it is particularly important these conditions be observed.

It is essential also that some water be present, although whether supplied as such or as diluent of HF appears immaterial, and it is not possible definitely to specify an absolute minimum limit for the proportion of HF that must be supplied. The water present, however, may not exceed 16.25 moles per mole of $PF_5$, and HF must be supplied at least in quantity sufficient to satisfy the ratio 1 mole HF : 1.625 moles $H_2O$ as otherwise the water seems to inhibit reaction between $PF_5$ and HF. Thus while there must be some water available to supply an ionization medium for the $HPF_6$ produced, either too much water in relation to the amount of $PF_5$ or too much in relation to the amount of HF must be avoided.

Under suitable conditions, however, with water present within the limits stated, HF and phosphorus pentafluoride react together to yield hexa acid substantially in accordance with the following equation:

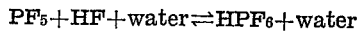

$$PF_5 + HF + water \rightleftharpoons HPF_6 + water$$

As noted, escape of gaseous constituents including $PF_5$ should be avoided, either by introducing the materials separately into a closed container, or by passing gaseous $PF_5$ into a solution of HF maintained at low temperature, such as at or below $-10°$ C.

The latter procedure using 1.9 parts of a solution containing 52.6% HF and 6.3 parts of gaseous $PF_5$ and thus with the constituents of the reacting mass substantially conforming to the ratio 1 mole $PF_5$ : 1 mole HF : 1 mole $H_2O$ yields a solution containing 84.5% $HPF_6$, corresponding to 94.9% of the theoretical yield.

Such solution, as more fully explained in said prior application, may be purified if desired by further dilution with water followed by cooling to precipitate hexafluorophosphoric acid hexahydrate, recovering the crystalline precipitate and redissolving it in water to produce a pure solution of HPF$_6$ suitable for use in industry and the arts.

It will be appreciated that for best yields of HPF$_6$ it is desirable to supply an excess of HF above that required to just equal the sum of 1 mole HF : 1 mole PF$_5$ and 1 mole HF : 1.626 moles H$_2$O, in other words to employ aqueous HF of a concentration of at least about 40% HF, as a moderate excess of HF tends to drive the foregoing equation to the right and thus increase the yield of HPF$_6$ but larger amounts have yielded no products indicating a higher degree of fluorination than that represented by the formula HPF$_6$ can be attained.

The stated maximum limit for water present, namely 16.25 moles : 1 mole PF$_5$ may not be exceeded, however, as beyond this limit no amount of HF, however large, appears to bring about equilibrium formation of HPF$_6$ from PF$_5$, while the minimum limit for water is determined, not by the readiness of the reaction between HF and PF$_5$ to proceed, but by the necessity for an ionization medium for the product of the reaction which cannot occur in a wholly anhydrous system but does proceed satisfactorily with only a small amount of water present.

As water does however have some tendency to hamper the progress of the reaction this tendency may be counteracted by supplying some HF in addition to 1 mole HF : 1 mole P and 1 mole HF : 1.625 moles H$_2$O; for practical purposes desirable minimum proportions for HF and H$_2$O in the starting materials may therefore be as indicated by the following equation:

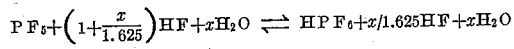

in which $x$ may be any number significantly greater than 0 and not greater than 16.25.

While we have thus particularly described the method of this invention with reference to the production of hexa acid from PF$_5$ it will be understood we do not desire or intend to limit or confine ourselves thereto as changes and modifications therein which will occur to those skilled in the art may be made without departing from the spirit and scope of the invention as defined in the appended claims.

Having thus described our invention, we claim and desire to protect by Letters Patent of the United States:

1. The method of producing hexafluorophosphoric acid which comprises mixing phosphorus pentafluoride with water-containing hydrogen fluoride in which hydrogen fluoride is present in excess of 1 mole per 1.625 moles of water in the ratio of about 1 mole of hydrogen fluoride per mole of phosphorus pentafluoride, and preventing escape of gaseous compounds during the reaction until equilibrium is attained.

2. The method of producing hexafluorophosphoric acid which comprises mixing phosphorus pentafluoride with hydrogen fluoride in the presence of water not in excess of 16.25 moles of water per mole of phosphorus pentafluoride in the ratio of about 1 mole of hydrogen fluoride per mole of phosphorus pentafluoride, and preventing escape of gaseous compounds during the reaction.

3. The method of producing hexafluorophosphoric acid which comprises progressively introducing gaseous phosphorus pentafluoride into a water solution of hydrogen fluoride containing in excess of 1 mole of hydrogen fluoride per 1.625 moles of water until more than 1 mole of phosphorus pentafluoride per 16.25 moles of water present has been introduced thereinto while maintaining the solution at a reduced temperature to thereby inhibit escape of gaseous compounds therefrom until equilibrium is attained.

4. The method of producing hexafluorophosphoric acid which comprises progressively introducing gaseous phosphorus pentafluoride into a water solution containing at least about 40% by weight of hydrogen fluoride until equilibrium is attained.

WILLY LANGE.
RALPH LIVINGSTON.

REFERENCES CITED

The following references are of record in the file of this patent:

UNITED STATES PATENTS

| Number | Name | Date |
|---|---|---|
| 2,408,785 | Lange | Oct. 8, 1946 |

OTHER REFERENCES

Mellor, Comprehensive Treatise on Inorganic and Theoretical Chemistry, vol. VIII, pages 997–998—(1928), Longmans Green & Co.